US012583720B2

(12) United States Patent
Hamlik et al.

(10) Patent No.: US 12,583,720 B2
(45) Date of Patent: *Mar. 24, 2026

(54) HIGH VISIBILITY PUSH-PULL FORKLIFT ATTACHMENT

(71) Applicant: Rightline Equipment, Inc., Rainer, OR (US)

(72) Inventors: Jim D. Hamlik, Vancouver, WA (US); Joel D. Hamlik, Vancouver, WA (US); Cameron R. Burak, Vancouver, WA (US)

( * ) Notice: Subject to any disclaimer, the term of this patent is extended or adjusted under 35 U.S.C. 154(b) by 1091 days.

This patent is subject to a terminal disclaimer.

(21) Appl. No.: 17/029,017

(22) Filed: Sep. 22, 2020

(65) Prior Publication Data

US 2021/0002113 A1 Jan. 7, 2021

Related U.S. Application Data

(63) Continuation of application No. 15/943,156, filed on Apr. 2, 2018, now Pat. No. 10,793,407.

(60) Provisional application No. 62/480,220, filed on Mar. 31, 2017.

(51) Int. Cl.

| | |
|---|---|
| ***B66F 9/19*** | (2006.01) |
| ***B66F 9/08*** | (2006.01) |
| ***B66F 9/12*** | (2006.01) |

(52) U.S. Cl.

CPC .............. *B66F 9/195* (2013.01); *B66F 9/122* (2013.01); *B66F 9/08* (2013.01)

(58) Field of Classification Search

CPC ............. B66F 9/12; B66F 9/122; B66F 9/195

USPC ................................ 414/234, 235, 238, 241

See application file for complete search history.

(56) References Cited

U.S. PATENT DOCUMENTS

| | | | | |
|---|---|---|---|---|
| 4,890,973 A * | 1/1990 | Frison | B66F 9/195 414/661 |
| 2013/0195592 A1* | 8/2013 | Meijer | B66F 9/195 414/661 |

* cited by examiner

*Primary Examiner* — Saul Rodriguez

(74) *Attorney, Agent, or Firm* — Rylander & Associates, PC; Philip R. M. Hunt

(57) ABSTRACT

A high visibility push-pull handler configured to be mounted on a lift truck. The handler comprising a frame assembly, a pantograph mechanism coupled to the frame assembly, and a faceplate assembly coupled to the pantograph mechanism. The hander is configured with a view window extending through the handler, the view window not obstructed by parts of the handler when the handler is in any normal operating configuration, including a fully extended configuration, a fully retracted configuration, and any configuration in between the full extended and fully retracted positions.

13 Claims, 9 Drawing Sheets

HIGH VISIBILITY PUSH-PULL FORKLIFT ATTACHMENT

TECHNICAL FIELD

The present invention relates to cargo handling equipment. More particularly, the present invention relates to push-pull attachments for use primarily with lift trucks.

BACKGROUND

Material handling vehicles such as lift trucks are used to pick up and deliver loads between stations. A typical lift truck 10 has a mast 12, which supports a load-lifting carriage 14 that can be raised along the mast 12 (see FIG. 1). The carriage 14 typically has one or more carriage bars 16 to which a fork frame 18 is mounted. The carriage bars 16 are coupled to the mast in a way that allows the lift truck 10 to move the carriage bars 16 up and down, but not laterally relative to the truck. The fork frame 18 carries a pair of forks 20. An operator of the lift truck 10 maneuvers the forks 20 beneath a load prior to lifting it.

Push-pull handlers, configured for mounting on the carriage bars 16 of lift trucks as alternatives to fork frames 18 and forks 20, are known. However, the prior art push-pull handlers obstruct too much of the view of the operator of the lift truck.

BRIEF DESCRIPTION OF THE DRAWINGS

The accompanying drawings, which are incorporated into and constitute a part of this specification, illustrate one or more embodiments of the inventive subject matter and, together with the detailed description, serve to explain the principles and implementations thereof. Like reference numbers and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

DETAILED DESCRIPTION

In describing the one or more representative embodiments of the inventive subject matter, use of directional terms such as "upper," "lower," "above," "below", "in front of" "behind," etc., unless otherwise stated, are intended to describe the positions and/or orientations of various components relative to one another as shown in the various Figures and are not intended to impose limitations on any position and/or orientation of any component relative to any reference point external to the Figures.

In the interest of clarity, not all of the routine features of representative embodiments of the inventive subject matter described herein are shown and described. It will, of course, be appreciated that in the development of any such actual implementation, numerous implementation-specific decisions must be made in order to achieve specific goals, such as compliance with application and business-related constraints, and that these specific goals will vary from one implementation to another and from one developer to another. Those skilled in the art will recognize that numerous modifications and changes may be made to the representative embodiment(s) without departing from the scope of the claims. It will, of course, be understood that modifications of the representative embodiments will be apparent to those skilled in the art, some being apparent only after study, others being matters of routine mechanical, chemical and electronic design. No single feature, function or property of the representative embodiments is essential. In addition to the embodiments described, other embodiments of the inventive subject matter are possible, their specific designs depending upon the particular application. As such, the scope of the inventive subject matter should not be limited by the particular embodiments herein described but should be defined only by the appended claims and equivalents thereof.

Representative Embodiment

Figure 1:
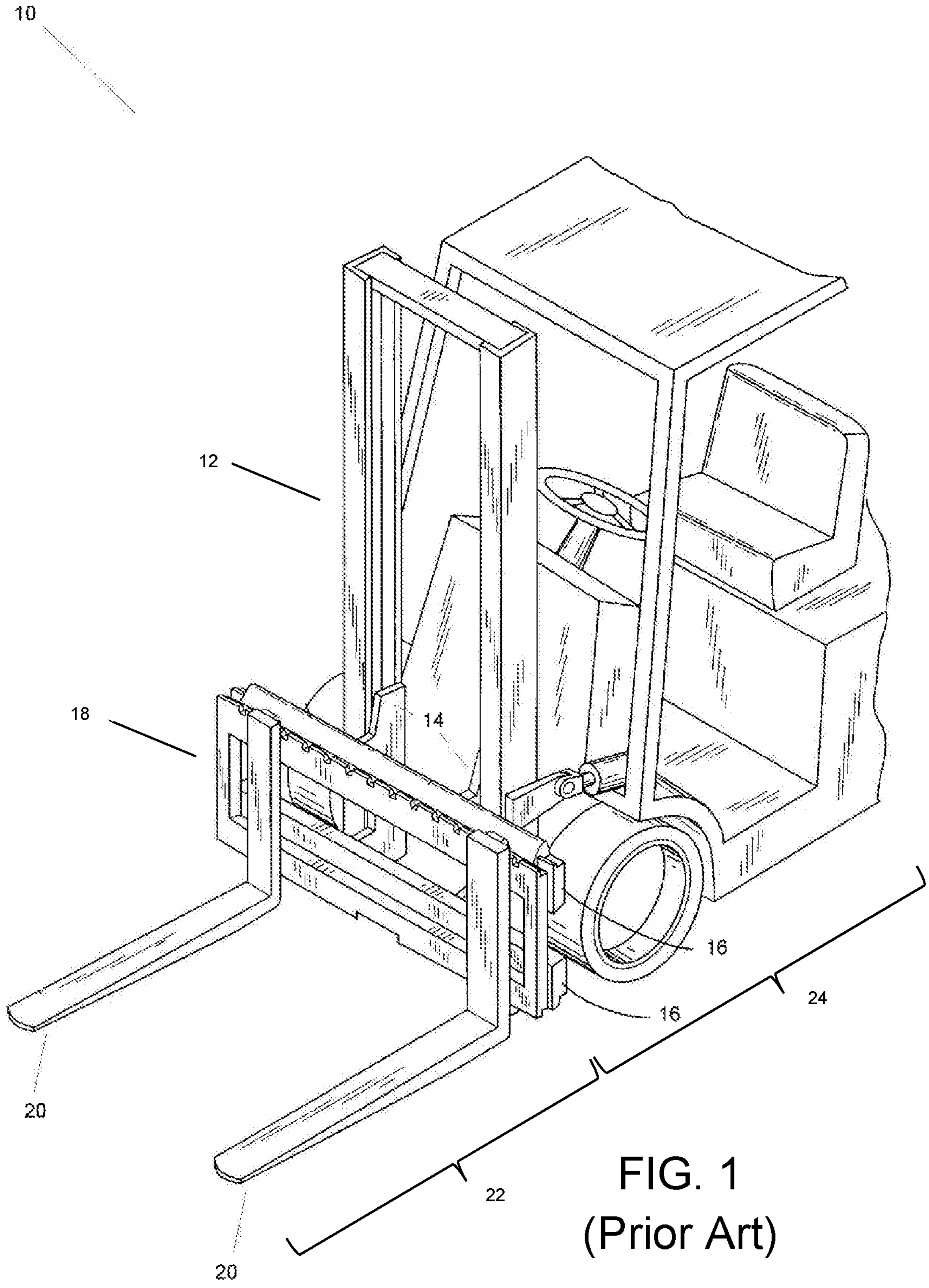
FIG. 1 (Prior Art)
FIG. 1 shows a perspective view of a lift truck (prior art).
Figure 2:
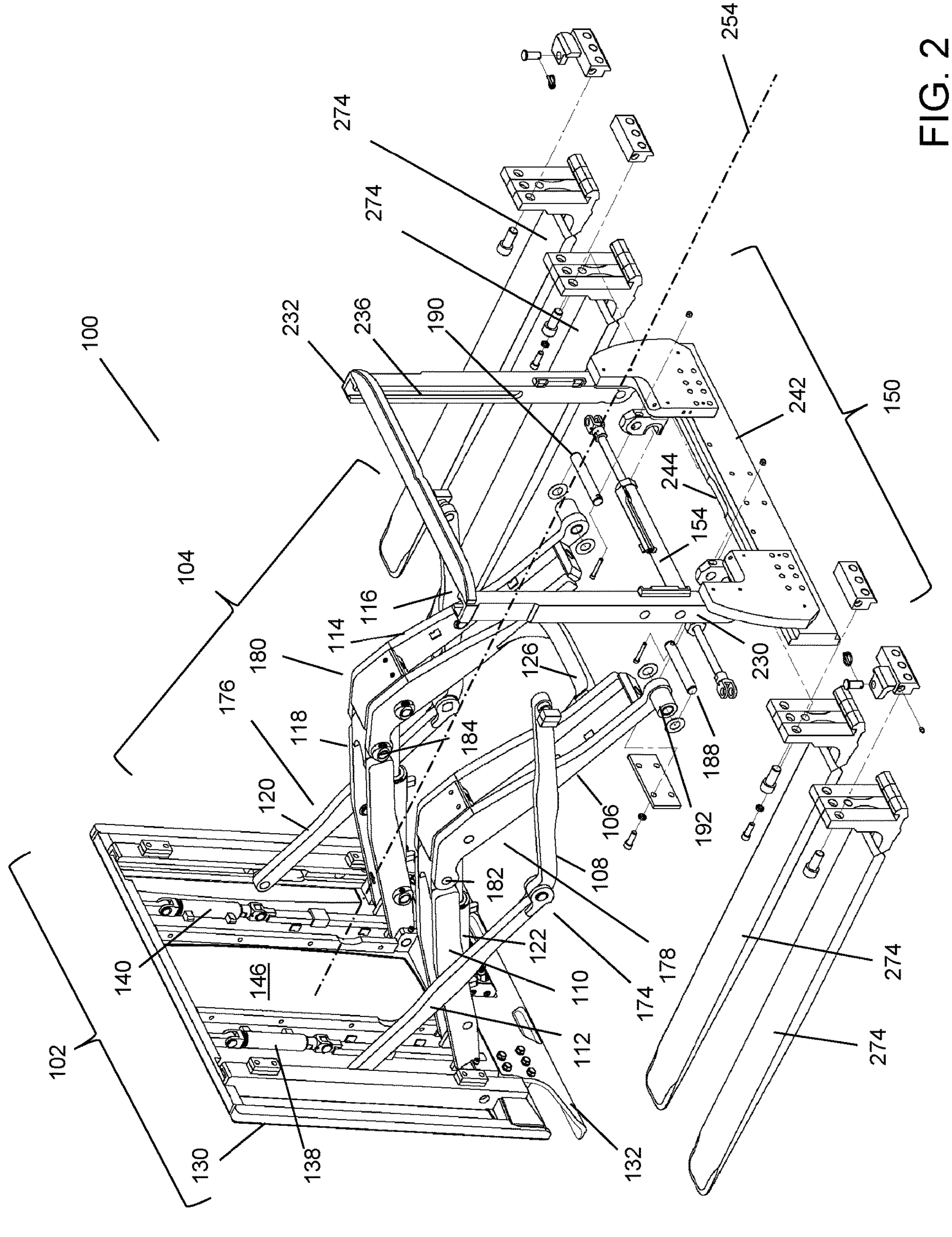
FIG. 2 shows a perspective view of a high visibility push-pull handler.
Figure 3:
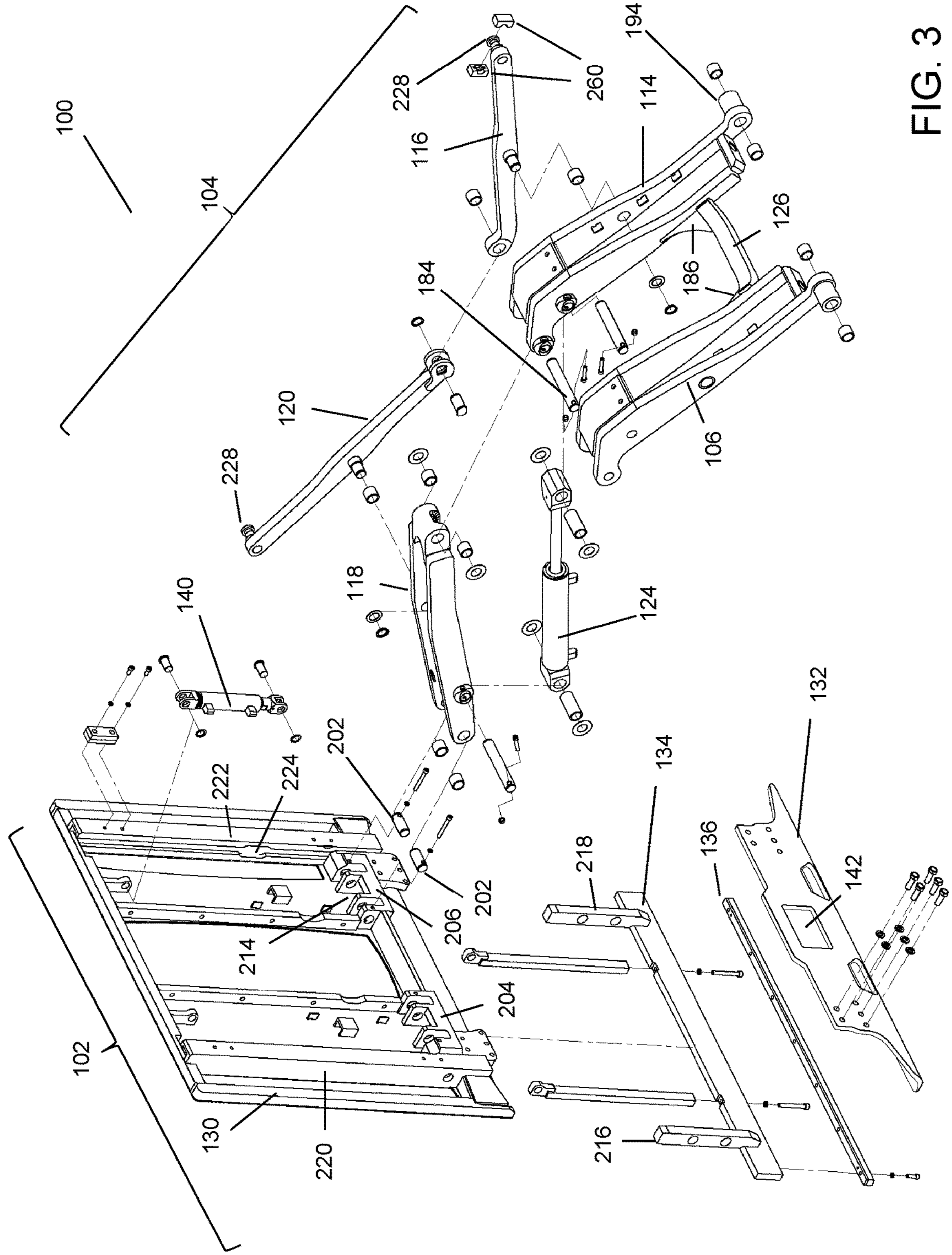
FIG. 3 shows an exploded perspective view of a high visibility push-pull handler.
Figure 4:
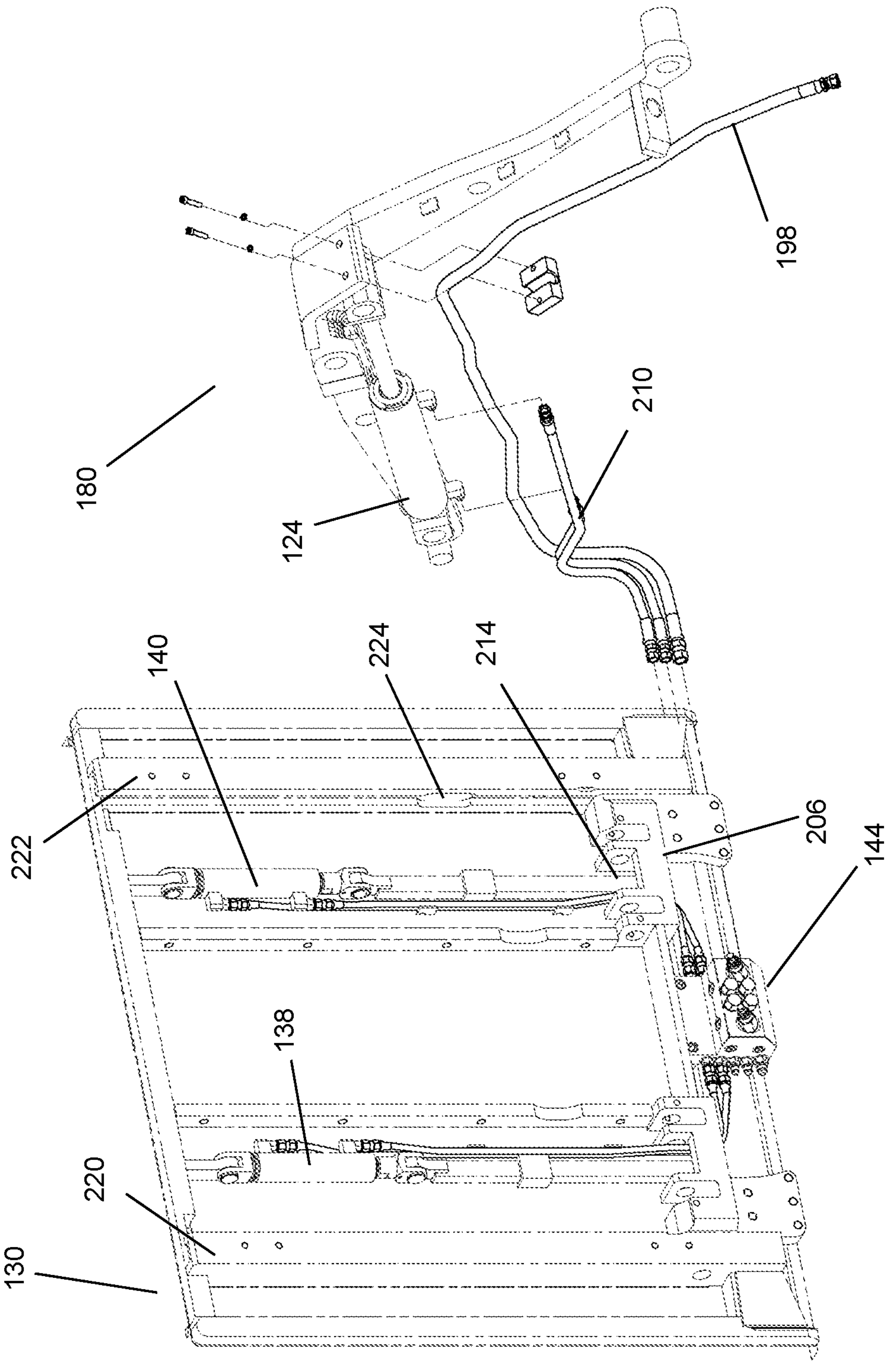
FIG. 4 shows an exploded perspective view of a faceplate assembly and a right inner arm of a high visibility push-pull handler.
Figure 5:
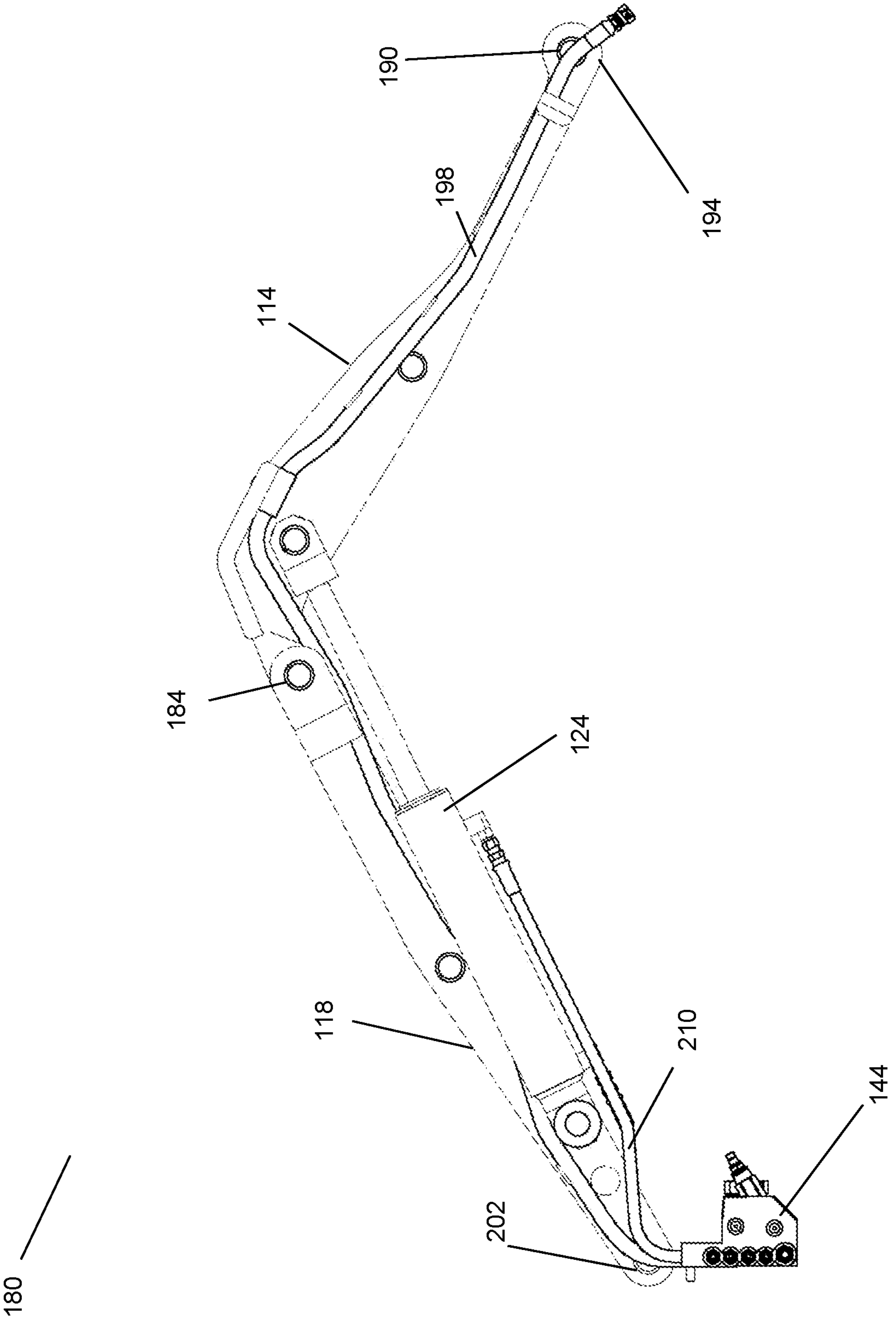
FIG. 5 shows a side view of a right inner arm of a high visibility push-pull handler.
Figure 6:
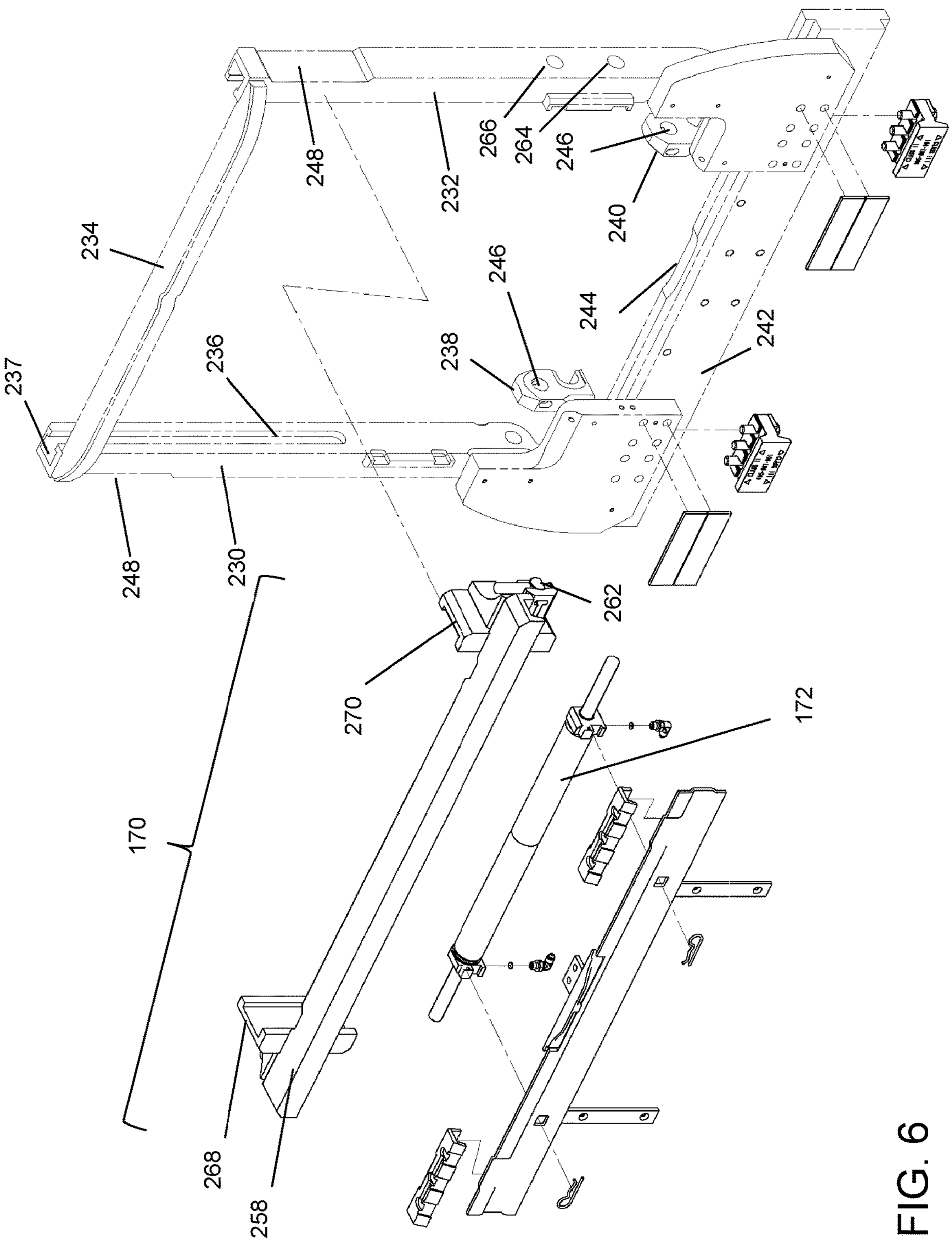
FIG. 6 shows an exploded perspective view of a frame assembly and a top hook assembly.
Figure 7:
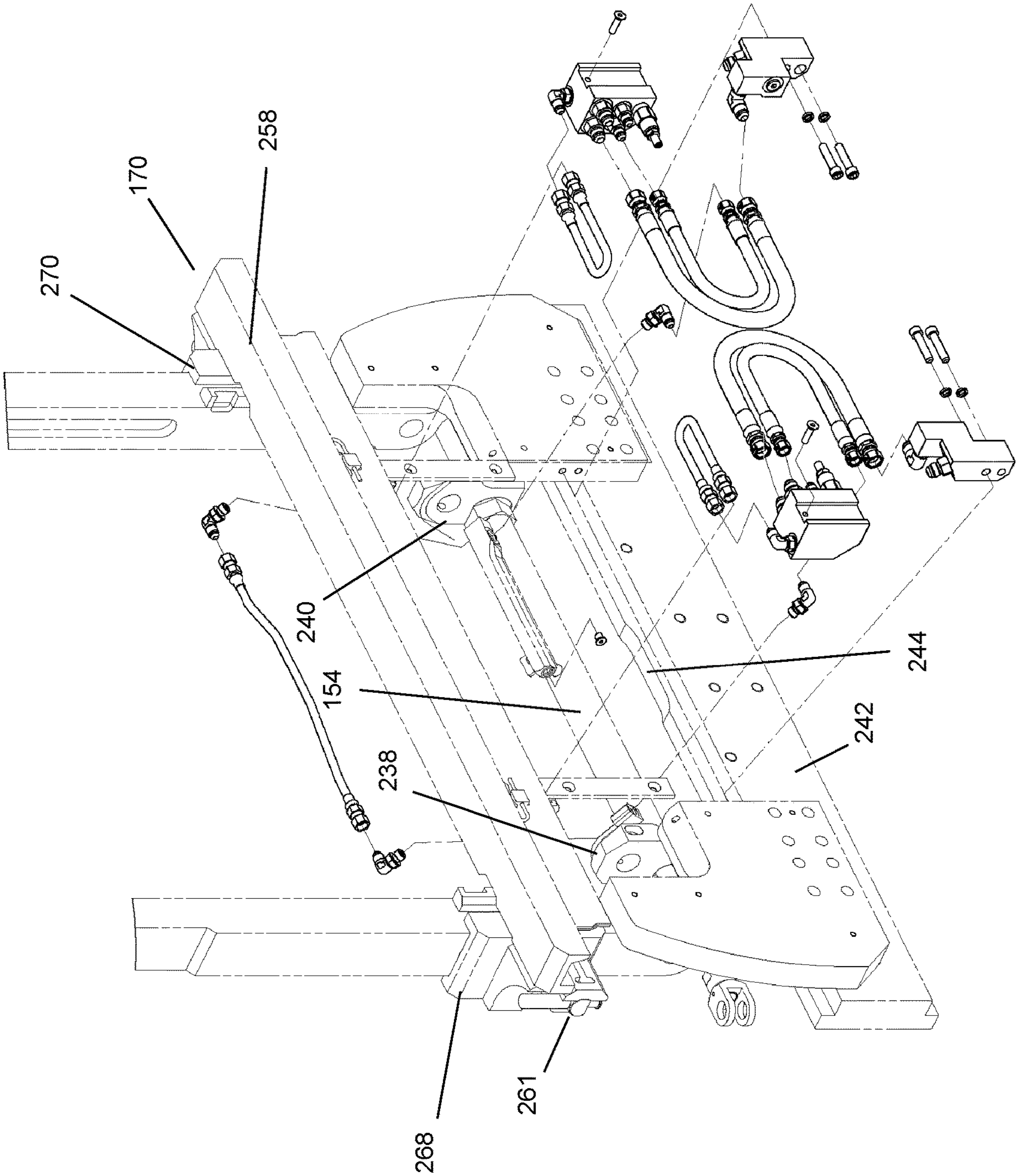
FIG. 7 shows an exploded perspective view of a frame assembly.
Figure 8B:
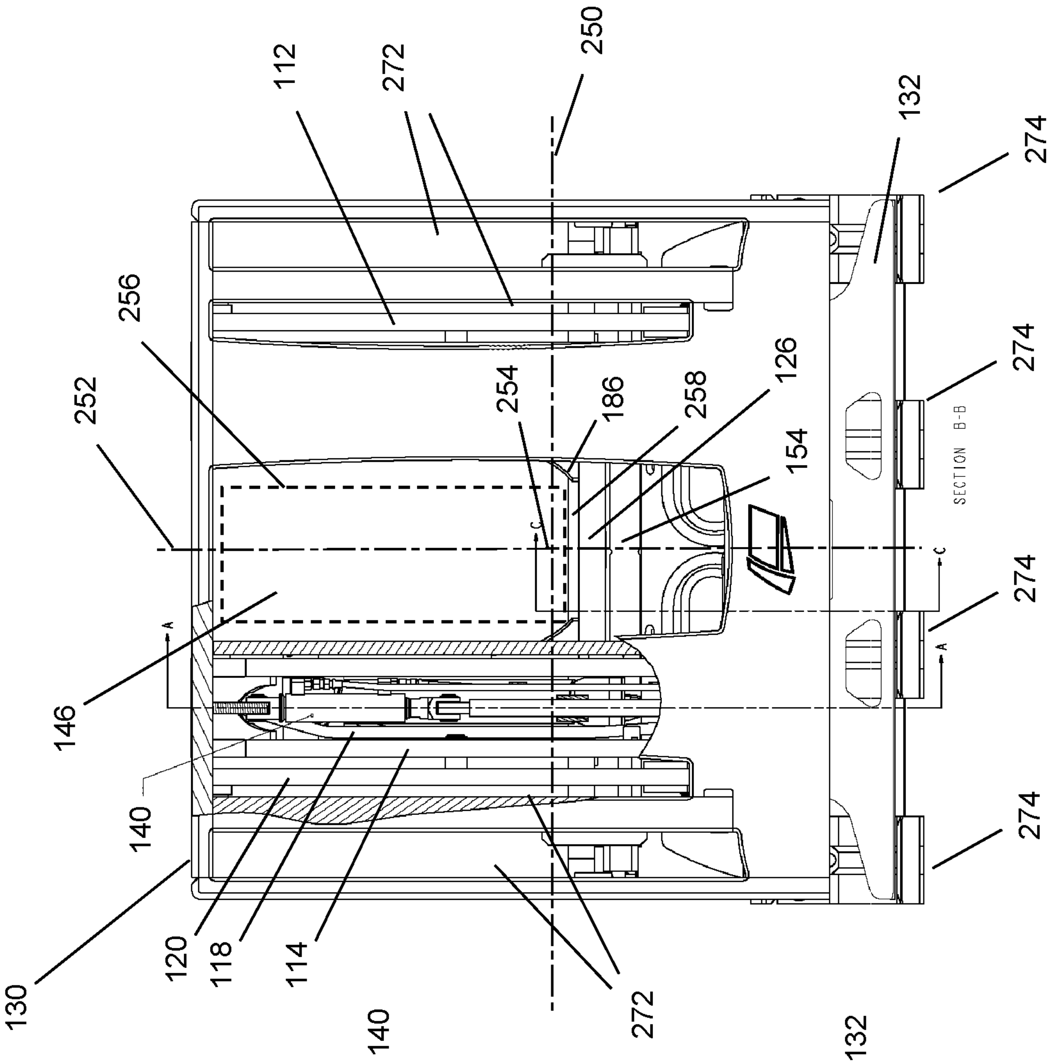
FIG. 8B shows a front cut-away view of a high visibility push-pull handler in a fully retracted configuration.
Figure 8A:
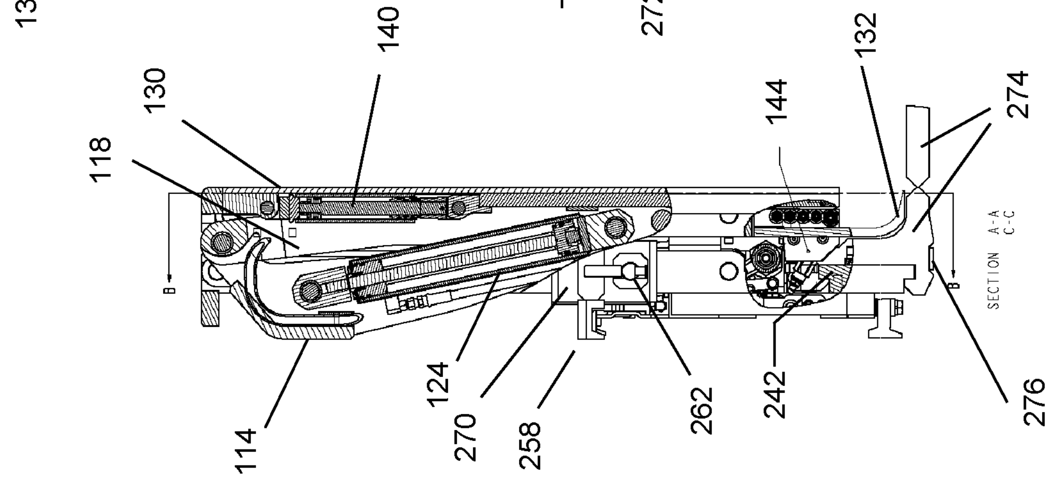
FIG. 8A shows a side cut-away view of a high visibility push-pull handler in a fully retracted configuration.

FIGS. 2 through 9 show various views of a representative embodiment of a high visibility push-pull handler 100. The high visibility push-pull handler 100 comprises a faceplate assembly 102 attached to a pantograph mechanism 104, which in turn is attached to a frame assembly 150. The high visibility push-pull handler 100 is configured to be mounted on a lift truck 10 (see FIG. 1) and configured to handle cargo set on a slipsheet while providing a view for a lift truck operator through a center of the handler 100 that is unobstructed by the handler 100. The handler 100 has an unobstructed view window 256 extending through the handler 100 when the handler 100 is in any normal operating configuration. That is, the view window 256 is not obstructed by parts of the handler 100, regardless of whether the handler 100 is in a fully extended configuration, in a fully retracted configuration, or any configuration in between (See FIGS. 2 and 8B). The view window 256 is not considered obstructed by trivial objects that do not significantly interfere with a lift truck operator's view through the view window 256, such as a wire or a string or other thin objects that are not capable of bearing significant compressive loads. Nor is the view window 256 considered obstructed by transparent objects that that do not significantly distort or otherwise interfere with a lift truck operator's view through the view window 256.

The view window 256 through the handler 100 has a cross-section orthogonal to a longitudinal center line 254 of the handler 100, extending laterally for a width of at least ⅛ of the width of the handler 100, and a height of at least ⅓ of the height of the handler 100. In the representative embodiment, the width of the handler 100 is 40 inches, matching the width of a standard pallet, the height is 40 inches, the width of the cross-section of the view window 256 is 10 inches and the height of the cross-section of the view window 256 is 20 inches. In other embodiments the width of the cross-section of the view window 256 may be as little as 5 inches and the height as little as 13⅓ inches, which is sufficient for a useful view window 256. In the representative embodiment, the unobstructed handler view window 256 is rectangular in cross-section, but in other embodiments may be oval. In the representative embodiment, view window 256 extends through the handler 100 along a longitudinal center line 254 of the handler 100, with the handler longitudinal center line 254 defined by the intersection of a handler horizontal center plane 250 and a handler vertical center plane 252. Though the longitudinal center line 254 passes through the view window 256, the view window 256 is not necessarily centered on the longitudinal center line 254. In other embodiments, the view window 256 may be shifted and/or smaller, such that the handler vertical center plane 252 passes through the view window 256, but the handler horizontal center plane 250 does not.

The faceplate assembly 102 in the representative embodiment 100 has a faceplate 130 with a faceplate center opening 146 that is at least as large as the handler view window 256. The faceplate assembly 102 has a left gripper actuator 138 and a right gripper actuator 140 attached to the faceplate 130 and flanking the faceplate center opening 146. The faceplate assembly 102 has a gripper jaw 132 attached to a lower portion of the faceplate 130. The faceplate assembly 102 has a gripper bar 134 that is slidingly coupled to the faceplate 130 and coupled to the left gripper actuator 138 and right gripper actuator 140. The left gripper actuator 138 and right gripper actuator 140 are configured to move the gripper bar 134 between an up position and a down position in contact with the gripper jaw 132.

The pantograph mechanism 104 comprises two inner arms 178, 180 and two outer arms 174, 176. The inner arms include a left inner arm 178 and a right inner arm 180. The outer arms 174, 176 include a left outer arm 174 and a right outer arm 176. The inner arms 178, 180 are attached with a pivoting attachment to the faceplate assembly 102 and with a pivoting attachment to the frame assembly 150. The outer arms 174, 176 are attached with sliding attachments (channel posts 228) to the faceplate assembly 102 and with sliding attachments to the frame assembly 150. The left inner arm 178 comprises a left inner primary arm 106 and a left inner secondary arm 110 that are pivotally coupled by a left inner arm center pivot pin 182. Likewise, the right inner arm 180 comprises a right inner primary arm 114 and a right inner secondary arm 118 that are pivotally coupled by a right inner arm center pivot pin 184. The left outer arm 174 comprises a left outer primary arm 108 and a left outer secondary arm 112 that are pivotally coupled. Likewise, the right outer arm 176 comprises a right outer primary arm 116 and a right outer secondary arm 120 that are pivotally coupled.

In the representative embodiment handler 100, the left inner arm 178 and the right inner arm 180 are only coupled by structures that are within a distance from one of the distal ends of the inner arms that is no more than one quarter of a length of one of the inner arms 178,180. This ensures that cross-bracing between the inner arms 178, 180 does not obscure the view window 256. In other embodiments, the left inner arm 178 and the right inner arm 180 are only coupled by structures that are within a distance from one of the distal ends of the inner arms that is no more than one third of a length of one of the inner arms 178,180. This results in a smaller view window than in the representative embodiment but is better than having a cross bar between the inner arms at or near the middle of the inner arms 178, 180. In the representative embodiment handler 100, other than indirectly connecting at the faceplate assembly 102 and the frame assembly 150, the left inner arm 178 and the right inner arm 180 are connected only at an inner arm cross bar 126. The inner arm cross bar 126 is connected to the inner arms 178, 180 such that the inner arm cross bar 126 is below the handler horizontal center plane 250 regardless of the configuration of the handler, even when the handler 100 is in a fully retracted configuration. In the representative embodiment, inner arm cross bar 126 is no higher than a top hook bar 258 of a top hook assembly 170 when the handler 100 is in any normal operating configuration. This configuration of the inner arm cross bar 126 provides for maintaining the handler view window 256 unobstructed regardless of whether the handler 100 is fully extended or fully retracted or in any other normal operating configuration.

The pantograph mechanism 104 includes two pieces of cross bar webbing 186, one between the the inner arms 178, 180 and the inner arm cross bar 126, extending towards the inner arm center pivot pins 182, 184. The cross-bar webbing 186 provides stiffness to resist lateral movement of the inner arms 178, 180, especially rotational movement or vibration about the inner arm cross bar 126, eliminating the need for additional cross bracing between the inner arms 178, 180 nearer the inner arm center pivot pins 182, 184. In the representative embodiment, there are no cross-bracing members between the two inner arms 178, 180, other than the faceplate assembly 102, the frame assembly 150, and the inner arm cross bar 126. Likewise, there is no cross-bracing members between the two outer arms 174, 176, other than the faceplate assembly 102, the frame assembly 150, and the inner arm cross bar 126 through the inner arms 178, 180. Elimination of cross bracing at the ends and jointed middles of the arms 174, 176, 178, 180 allows a larger unobstructed view through the high visibility push-pull handler 100 for a lift truck operator.

The pantograph mechanism 104 is configured so that when the handler 100 is in the fully retracted configuration, the gripper actuators 138, 140 nest within void spaces of the inner arms 178, 180. This allows the faceplate assembly 102 to be pulled in closer to the frame assembly 150 when the handler 100 is in a fully retracted configuration.

The left inner primary arm 106 has a left inner primary arm pivot bushing 192 that pivotally couples the left inner primary arm 106 to the frame assembly 150 with a left inner primary arm pivot pin 188. Likewise, the right inner primary arm 114 has a right inner primary arm pivot bushing 194 that pivotally couples the right inner primary arm 114 to the frame assembly 150 with a right inner primary arm pivot pin 190. The right inner primary arm pivot bushing 194 extends laterally outward to the right from the right inner primary arm 114, leaving space for a right arm hydraulic line 198 to pass to the left of the right inner primary arm pivot pin 190 through or near a longitudinal center line of the right inner primary arm pivot pin 190 (See FIG. 5), at least near enough so that at least a portion of the right arm hydraulic line 198 passes through a cylindrical volume around the longitudinal center line of the right inner primary arm pivot pin 190, with this right primary pivot pin cylindrical volume having a radius that is the same as that of the right inner primary arm pivot pin 190. As a result, little slack in the right arm hydraulic line 198 needs to be provided around the right inner primary arm pivot pin 190. Avoiding slack makes for more streamlined running of hydraulic lines with less potential for interfering with the view of the lift truck operator. Similarly, the left inner primary arm pivot bushing 192 extends laterally outward to the left from the left inner primary arm 106 and has a similar effect on a left arm hydraulic line (not shown), where the left arm hydraulic line passes through or near a longitudinal center line of the right inner primary arm pivot pin 190, (See FIG. 5) at least near enough so that at least a portion of the left arm hydraulic line passes through a cylindrical volume around a longitudinal center line of the left inner primary arm pivot pin 188, with this left primary pivot pin cylindrical volume having a radius that is the same as that of the left inner primary arm pivot pin 188.

The right inner secondary arm 118 pivotally couples to a right inner secondary arm pivot bracket 206 of the faceplate assembly 102 with two right inner secondary arm pivot pins 202. A right inner secondary arm pivot gap 214 is left between the right inner secondary arm pivot pins 202. This right inner secondary arm pivot gap 214 allows the right arm hydraulic line 198 and two right inner arm actuator hydraulic lines 210 to pass through or near a longitudinal center line of the right inner secondary arm pivot pins 202, (See FIG. 5) at least near enough so that at least a portion of the right arm hydraulic line 198 and the two right inner arm actuator hydraulic lines 210 pass through a cylindrical volume around the longitudinal center line of the right inner secondary arm pivot pin 202*s*, with this right secondary pivot pin cylindrical volume having a radius that is the same as that of the right inner secondary arm pivot pins 202. As a result, little slack in the right arm hydraulic line 198 or the right inner arm actuator hydraulic lines 210 needs to be provided around the right inner secondary arm pivot pins 202. The left inner secondary arm 110 is pivotally coupled to a left inner secondary arm pivot bracket 204 of the faceplate assembly 102 in a similar manner so that the left arm hydraulic line and two left inner arm actuator hydraulic lines pass through or near a longitudinal center line of the left inner secondary arm pivot pins, at least near enough so that at least a portion of the left arm hydraulic line passes through a cylindrical volume around a longitudinal center line of the left inner secondary arm pivot pins, with this right secondary pivot pin cylindrical volume having a radius that is the same as that of the right inner secondary arm pivot pin.

In the representative embodiment, a right inner arm center pivot pin 184 pivotingly couples the right inner primary arm 114 to the right inner secondary arm 118. In other embodiments, two right inner arm center pivot pins couple the right inner primary arm 114 to the right inner secondary arm 118 with a gap between the two right inner arm center pivot pins that allows the right arm hydraulic line 198 to pass through or near a longitudinal center line of the two right inner arm center pivot pins, at least near enough wherein at least a portion of the right arm hydraulic line 198 passes through a cylindrical volume around a longitudinal center line of the two right inner arm center pivot pins, the right primary pivot pin cylindrical volume having a radius that is the same as that of the two right inner arm center pivot pins. Likewise, in the representative embodiment, a left inner arm center pivot pin 182 pivotingly couples the left inner primary arm 106 to the left inner secondary arm 110. In other embodiments, two left inner arm center pivot pins couple the left inner primary arm 106 to the left inner secondary arm 110. with a gap between the two left inner arm center pivot pins that allows the left arm hydraulic line to pass through or near a longitudinal center line of the two left inner arm center pivot pins, at least near enough wherein at least a portion of the left arm hydraulic line passes through a cylindrical volume around a longitudinal center line of the two left inner arm center pivot pins, the left primary pivot pin cylindrical volume having a radius that is the same as that of the two left inner arm center pivot pins.

The high visibility push-pull handler 100 has a streamlined hydraulic system that aids in keeping the view through the center of the handler 100 clear and unobstructed. Only two lines are needed to run between the frame assembly 150 and the faceplate assembly 102 a right arm hydraulic line 198 coupled to the right inner arm 180, and a left arm hydraulic line (not shown) coupled to the left inner arm 178. The faceplate assembly 102 has a faceplate manifold 144 mounted on the faceplate 130 below the faceplate center opening 146. In a top back side of the gripper jaw 132 there is a gripper jaw manifold hole 142 that allows the faceplate manifold 144 to protrude through the gripper jaw 132. The hydraulic lines enter the faceplate manifold 144 from the side, between the faceplate 130 and the gripper jaw 132. In addition to ports for the left arm hydraulic line and right arm hydraulic line 198, the faceplate manifold 144 has ports for 8 hydraulic lines to operate 4 actuators—a left inner arm actuator 122 and a right inner arm actuator 124 as well as the left gripper actuator 138 and the right gripper actuator 140. All four actuators operate in unison, with the faceplate manifold 144 coordinating their movements. The left gripper actuator 138 and right gripper actuator 140 are configured to pull up the gripper bar 134 when the left inner arm actuator 122 and right inner arm actuator 124 are extending and configured to push down the gripper bar 134 when the left inner arm actuator 122 and right inner arm actuator 124 are retracting. In some embodiments, the faceplate manifold 144 causes the gripper actuators 138, 140 complete movement of the gripper bar 134 before the inner arm actuators 122, 124 begin movement of the pantograph mechanism 104. While the inner arm actuators 122, 124 are moving the pantograph mechanism 104, the gripper actuators 138, 140 maintain the position of the gripper bar 134. Sequence valves may be used to coordinate raising and lower of the gripper bar 134 with extension and retraction of the pantograph mechanism 104. No valves are necessary in the faceplate manifold 144 or anywhere on the faceplate assembly 102 to change the direction of hydraulic fluid flow to the inner arm actuators 122, 124 and gripper actuators 138 and 140. A single four port, three position valve on the lift truck 10 is used to control the high visibility push-pull handler 100.

The faceplate manifold 144 is positioned on the faceplate 130 such that when the high visibility push-pull handler 100 is in a fully retracted configuration, a portion of the faceplate manifold 144 extends above and rearward of the frame beam 242 (See FIG. 8A), allowing the faceplate 130 to more fully retract against the frame assembly 150. In the representative embodiment, the frame beam 242 has a frame beam pocket 244 carved out on its front side configured to accommodate the faceplate manifold 144. When the high visibility push-pull handler 100 is in a fully retracted configuration, a portion of the faceplate manifold 144 extends into the frame beam pocket 244 when the handler 100. This arrangement allows the faceplate manifold 144 to be positioned lower in the faceplate 130, rather than high enough to miss the frame beam 242 completely. This in turn allows the faceplate center opening 146 to extend lower in the faceplate 130 as well, increasing the view window through the high visibility push-pull handler 100. In other embodiments, the frame beam 242 does not have a frame beam pocket 244.

A left faceplate channel 220 and a right faceplate channel 222 are included in the faceplate assembly 102 and attached to the faceplate 130 to the left and right of the faceplate center opening 146, respectively. Typically, the left faceplate channel 220 and the right faceplate channel 222 are positioned laterally further outboard from the left gripper actuator 138 and right gripper actuator 140. The faceplate channels 220, 222 serve several functions. First, they act as T-slot guides for the faceplate channel posts 228. The faceplate channels 220, 222 have similar T-slot structure and function as the frame towers 230, 232 (see FIG. 9). Second, they act as guides for the gripper bar posts 216, 218. The faceplate channel posts 228 slide within the faceplate channels 220, 222 as the high visibility push-pull handler 100 changes between the full extended and the fully retracted configurations. In some embodiments, the faceplate channels 220, 222 serve a third function—they act as surfaces for contacting a load on the handler 100. Not only does the faceplate 130 have a large faceplate center opening 146 for increasing visibility for the lift truck 10 operator, but also has one or more faceplate side openings 272. While it is desirable for these faceplate side openings to be as large as possible for visibility purposes, their size may be limited by a need for some structure on the front of faceplate 130 to contact the load when the high visibility push-pull handler 100 is extending and the faceplate 130 is pushing the load off the platens 274. In some embodiments, the faceplate channels 220, 222 provide contact surface for pushing a load when the handler 100 is extending, allowing more and/or larger faceplate side openings 272. The faceplate channels 220, 222 performing these functions not only save materials and weight, but also allow the components attached to the faceplate 130 to be arranged in a more compact way laterally than otherwise, which in turn facilitates the faceplate center opening 146 being wider than it otherwise could be.

Each of the faceplate channels 220, 222, has a faceplate channel opening 224 to allow insertion and removal of the faceplate channel posts 228 during maintenance operations. The faceplate channel openings 224 are located low enough so that the faceplate channel posts 228 do not reach them during normal operations, even when the high visibility push-pull handler 100 is in the fully extended configuration.

The frame assembly 150 comprises a frame beam 242, a left frame tower 230, a right frame tower 232, a left frame arm bracket 238, and a right frame arm bracket 240. The left frame tower 230 and the right frame tower 232 are attached to the front side of the frame beam 242. The frame towers 230, 232 perform multiple functions.

Figure 9:
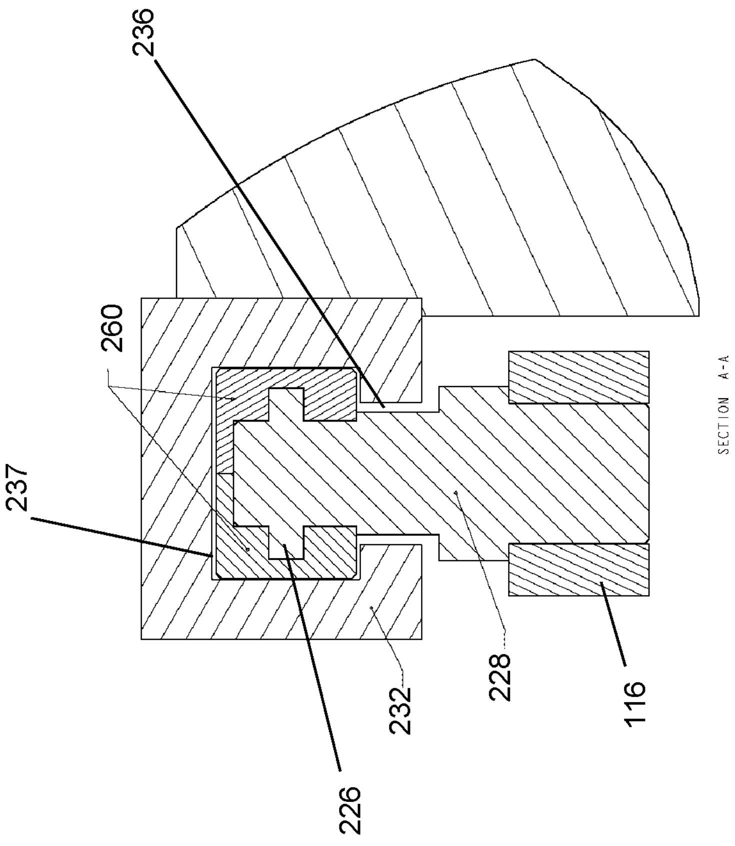
FIG. 9 shows a sectional view of a frame tower of the frame assembly.

One function of the frame towers 230, 232 is guiding the outer arms 174, 176. Each of the frame towers 230, 232, have a channel with a channel slot 236 and channel cavity 237. The channel slots 236 are T-shaped for guiding the channel posts 228 within the frame tower channel slots 236 as the pantograph mechanism 104 extends and retracts. The frame tower channel slots 236 are open on top for easy removal of the channel post 228 in maintenance, but the channel posts 228 do not pass the top of the frame tower channel slots 236 during normal operations, even when the pantograph mechanism 104 is fully retracted. FIG. 9 shows a sectional view of the right frame tower 232. The channel post 228 is encapsulated with t-slot bearings 260. The t-slot bearings 260 facilitate sliding within the channel cavity 237 and give lateral support to the channel post 228, preventing lateral movement. The channel posts 228 have post wings 226 that are wider than the channel slot 236 to prevent the channel post 228 from exiting the slot if the t-slot bearings 260 wear out or are destroyed.

Another function of the frame towers 230, 232 is supporting the inner arms 178, 180. The frame towers 230, 232 have inner arm pivot pin holes 246, which, together with inner arm pivot pin holes 246 in the frame arm brackets 238, 240, accept the inner primary arm pivot pins 188, 190. The inner primary arm pivot bushings 192, 194 of the inner primary arms 106, 114 slidingly fit in the gap between the frame towers 230, 232 and the frame arm brackets 238, 240. The frame arm brackets 238, 240 also hold a platen shift actuator 154. In some embodiments, inner primary arm pivot pins, 188, 190 are not coupled with the frame arm brackets 238, 240, but only with the frame towers 230, 232.

Yet another function of the frame towers 230, 232 is supporting the top hook assembly 170. The top hook assembly 170 is configured for transferring load forces to the lift truck 10 and, in some embodiments, for shifting the handler 100 left and right relative to the lift truck 10. In the representative embodiment handler 100, the top hook assembly 170 comprises the top hook bar 258, a left top hook bracket 268. a right top hook bracket 270 and a side shift actuator 172. The frame towers 230, 232 have frame tower indentations 248 that allow the top hook assembly 170 to be placed on the frame towers 230, 232 and then slid down and secured into position close to where the frame towers 230, 232 are attached to the frame beam 242. The top hook assembly 170 is configured to slidingly engage with the carriage 14 of the lift truck 10. However, in other embodiments, the side shift actuator 172 is omitted, in which case the engagement between the top hook assembly 170 and the carriage 14 is not a sliding one, but fixed. Load is transferred from the platens 274 to the frame beam 242 to the frame towers 230, 232 to the top hook assembly 170, then to the carriage 14 of the lift truck 10. The frame towers 230, 232 are the only vertical structural support between the top hook bar 258 and the lower parts of the frame assembly 150, such as the frame beam 242 and the frame arm brackets 238, 240. Thus, all vertical loads transferred from the frame assembly 150 to the carriage 14 of the lift truck 10 are transferred through the frame towers 230, 232. In the representative embodiment, the top hook assembly 170, the left and right frame towers 230, 232 have a securing mechanism for securing without tools the top hook assembly 170 in a first position that configures the handler for mounting to an ITA (Industrial Truck Association) class 2 lift truck carriage or a second position that configures the handler for mounting to an ITA class 3 lift truck carriage. In the representative embodiment handler 100, the frame towers 230, 232 are configured with two sets of pin holes 264, 266 for securing the top hook assembly 170 to the frame towers 230, 232 with top hook pins in two different positions—one position for mounting to an ITA class 2 lift truck carriage and one position for mounting to an ITA class 3 lift truck carriage. ITA class 2 specifies a 16" carriage height and ITA class 3 specifies a 20" carriage height. This allows for toolless mounting of the top hook assembly 170 to the frame towers 230, 232 and toolless transition between the class 2 and class 3 positions. In other embodiments, some other mechanism may be used for securing the top hook assembly 170 to the frame towers, 230, 232, such as notches and ratcheting latches.

Since the frame arm brackets 238, 240 and the frame towers 230, 232 perform multiple functions, they and the other components of the frame assembly 150 and components attached thereto can be arranged more compactly, allowing for a larger unobstructed viewing window 256 through the frame assembly 150 than would be possible otherwise.

In some embodiments, a top bar of the faceplate 130 over the faceplate center opening 146 and the frame cross bar 234 are not included. This is possible due to the robust construction of the frame beam 242, the other parts of the faceplate 130, the frame towers 230, 232 and the faceplate channels 220, 222 allowing for an even more unobstructed view for the lift truck user.

The high visibility push-pull handler 100 has one or more platens 274 coupled to the frame beam 242. The handler 100 is configured to allow the platens 274 to be mounted from the side on a single structural member, the frame beam 242. The one or more platens 274 each have a wear plate 276 that extends the full width of the platen 274. The platen wear plates 276 are comprised of manganol or some other suitable high hardness material. The wear plates 276 protect the one or more platens 274 from excessive wear and frequent replacement from being dragged across floors, pavement and other hard surfaces.

What is claimed is:

1. A high visibility push-pull handler configured to be mounted on a lift truck comprising:

a frame assembly comprising, a left frame tower, a right frame tower, a left frame arm bracket and a right frame arm bracket coupled to a frame beam, wherein the left and right frame towers each have a frame tower channel;

a top hook assembly coupled with the left and right frame towers and configured to couple with a carriage of a lift truck;

a faceplate assembly with a faceplate, a right faceplate channel coupled to the faceplate, a left faceplate channel coupled to the faceplate; and a pantograph mechanism comprising a left inner arm, a right inner arm, a left outer arm, a right outer arm, wherein the left inner arm and the right inner arm each have two distal ends, one inner arm distal end pivotally coupled to the frame assembly and another inner arm distal end pivotally coupled to the faceplate assembly, wherein the left and right outer arms each have each have two distal ends, a first outer arm distal end with a frame tower channel post slidingly coupled with one of the frame towers, a second outer arm distal end with a faceplate channel post slidingly coupled with one of the faceplate channels.

2. The high visibility push-pull handler of claim 1, further comprising:

one or more platens coupled to the frame beam, wherein the handler is configured such that all loads transferred from the one or more platens to the lift truck are transferred through the frame beam.

3. The high visibility push-pull handler of claim 1, further comprising:

wherein the top hook assembly has a top hook bar coupled with the left and right frame towers and configured to couple with the carriage of a lift truck.

4. The high visibility push-pull handler of claim 3, wherein the left inner arm pivotingly couples to the left frame tower with a left inner primary arm pivot pin that passes through an inner arm pivot pin hole in the left frame tower; and wherein the right inner arm pivotingly couples to the right frame tower with a right inner primary arm pivot pin that passes through an inner arm pivot pin hole in the right frame tower.

5. The high visibility push-pull handler of claim 3, wherein the frame towers have frame tower indentations configured to allow the top hook assembly to be placed on the frame towers;

wherein the frame towers have frame tower pin holes; and wherein the top hook assembly is configured to be placed on the frame towers and then slid down and secured into position by engaging with the frame tower pin holes.

6. The high visibility push-pull handler of claim 1, wherein the faceplate assembly has a faceplate manifold coupled to the faceplate;

wherein the faceplate manifold controls a left inner arm actuator and a right inner arm actuator, a left gripper actuator and a right gripper actuator; and wherein the handler is configured such that a portion of the faceplate manifold passes behind a front side of the frame beam when the handler is in a fully retracted position.

7. The high visibility push-pull handler of claim 1, wherein the faceplate has a faceplate center opening; and wherein the faceplate has no loadbearing components above the faceplate center opening.

8. A high visibility push-pull handler configured to be mounted on a lift truck comprising:

a frame assembly;

a faceplate assembly comprising a faceplate;

a pantograph mechanism comprising a left inner arm, a right inner arm, a left outer arm, a right outer arm, wherein the left inner arm and the right inner arm each have two distal ends, one distal end coupled to the frame assembly and another distal end to the faceplate assembly;

a left arm hydraulic line running between the frame assembly and the faceplate assembly; and a right arm hydraulic line running between the frame assembly and the faceplate assembly.

9. The high visibility push-pull handler of claim 8, a left inner primary arm pivot pin pivotingly coupling the left inner arm to the frame assembly, wherein the left arm hydraulic line passes to the right of the left inner primary arm pivot pin; and a right inner primary arm pivot pin pivotingly coupling the right inner arm the frame assembly, wherein the right arm hydraulic line passes to the left of the right inner primary arm pivot pin.

10. The high visibility push-pull handler of claim 8, a left inner primary arm pivot pin pivotingly coupling the left inner arm to the frame assembly, wherein the left arm hydraulic line passes through a longitudinal center line of the left inner primary arm pivot pin; and a right inner primary arm pivot pin pivotingly coupling the right inner arm the frame assembly, wherein the right arm hydraulic line passes through a longitudinal center line of the right inner primary arm pivot pin.

11. The high visibility push-pull handler of claim 8, a left inner secondary arm pivot pin pivotingly coupling the left inner arm to the faceplate assembly, wherein the left arm hydraulic line passes through a longitudinal center line of the left inner secondary arm pivot pin; and a right inner secondary arm pivot pin pivotingly coupling the right inner arm to the faceplate assembly, wherein the right arm hydraulic line passes through a longitudinal center line of the right inner secondary arm pivot pin.

12. The high visibility push-pull handler of claim 8, two left inner secondary arm pivot pins pivotingly coupling the left inner arm to the faceplate assembly, wherein at least a portion of the left arm hydraulic line passes between the two left inner secondary arm pivot pins; and two right inner secondary arm pivot pins pivotingly coupling the right inner arms to the faceplate assembly, wherein at least a portion of the right arm hydraulic line passes between the two right inner secondary arm pivot pins.

13. A high visibility push-pull handler configured to be mounted on a lift truck comprising:

a frame assembly;

a top hook assembly configured to couple with the frame assembly, wherein the top hook assembly is configured to couple with a carriage of the lift truck;

a faceplate assembly;

a pantograph mechanism comprising a left inner arm, a right inner arm, a left outer arm, a right outer arm, wherein the left inner arm and the right inner arm each have two distal ends, one distal end coupled to the frame assembly and another distal end to the faceplate assembly;

a platen coupled to the frame assembly; and a platen wear plate coupled to the platen.

* * * * *